Figure 1:
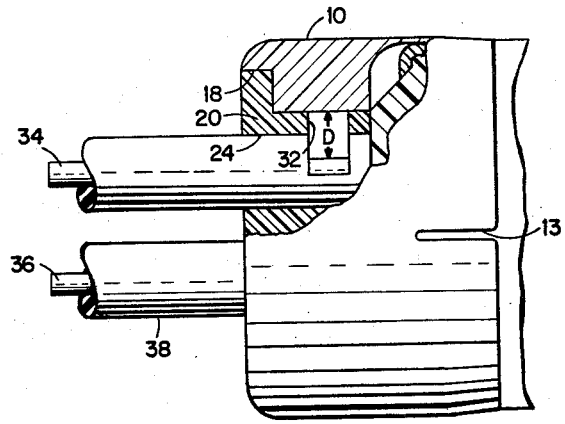

April 27, 1965     N. P. WILLIAMS, JR     3,180,263
STATIC ELECTRICITY DESENSITIZING DEVICE
Filed April 8, 1963     2 Sheets-Sheet 1

Nathan P. Williams, Jr.,
INVENTOR.

April 27, 1965 N. P. WILLIAMS, JR 3,180,263
STATIC ELECTRICITY DESENSITIZING DEVICE
Filed April 8, 1963 2 Sheets-Sheet 2

Nathan P. Williams, Jr.,
INVENTOR.

3,180,263
STATIC ELECTRICITY DESENSITIZING DEVICE
Nathan P. Williams, Jr., Huntsville, Ala., assignor to the United States of America as represented by the Secretary of the Army
Filed Apr. 8, 1963, Ser. No. 271,527
1 Claim. (Cl. 102—28)
(Granted under Title 35, U.S. Code (1952), sec. 266)

The invention described herein may be manufactured and used by or for the Government for governmental purposes without the payment of any royalty thereon.

This invention relates to a device for densitizing to static electrical charges an electrically energized blasting initiator, detonator, squib, or the like. More particularly, the invention concerns a device that provides an arc gap for these electrically energized components so that any static electricity which accumulates in the component can safely discharge across the gap and thereby afford protection against unplanned firing resulting from the discharge of an electrical current through the bridge wire or from an electrical spark jumping from the wire to the wall through the pyrotechnic composition.

The prior art discloses many varied electrically fired blasting initiators, detonators, and squibs. Representative examples are described in U.S. Patents 2,801,585, and 2,878,752. These devices have gained widespread acceptance as the firing means for explosive charges and as the ignition means in rocket engines.

However, one danger associated with the use of these devices is their tendency to accidentally fire when subjected to stray electrical currents, usually from the accumulation of static electricity. This danger is especially prevalent in the field of rocketry where complex electronic tracking instrumentation is part of the missile firing complex. One means of overcoming this problem is to provide an arc gap in the initiator or squib so that stray electrical charges can be discharged to some nearby conductor before reaching the exploding bridge and igniting the pyrotechnic material.

It has now been determined that a simple static electricity desensitizing device can eliminate the danger of accidental firing of explosives and rockets by providing a point of discharge for stray electrical currents outside the squib or initiator. Moreover, the device of the invention permits the variation of the safety limit by allowing a variation in the size of the arc gap thus providing greater flexibility of usage. The simplicity and reliability of the device allows installation in the field without special tools or equipment.

In accordance with the foregoing, it is an object of the present invention to provide a device for desensitizing electrically fired squibs, detonators, or initiators to stray currents of electricity, particularly those arising from the accumulation of static electrical charges.

A further object of the invention is to provide a device which permits variation in the degree of desensitization to stray currents of electricity in electrically fired initiators, squibs, or detonators.

A still further object of the invention is to provide a device for electrically desensitizing squibs, initiators, or detonators which can be installed in the field.

Figure 2:
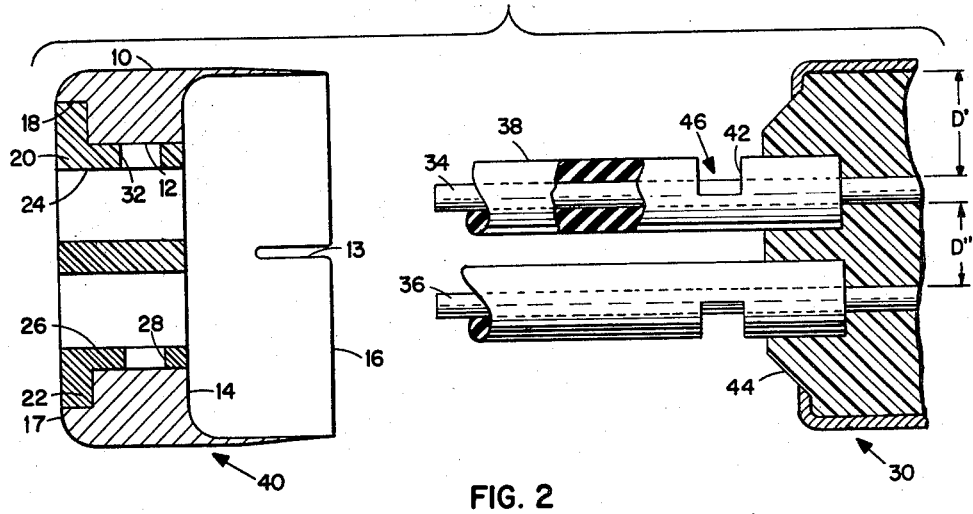
Figure 3:
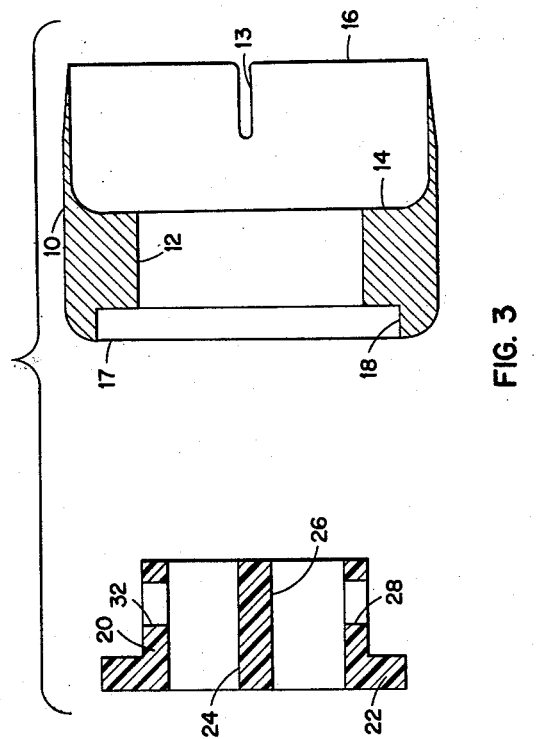

The manner in which these and other objects may be attained will become apparent from the detailed discussion presented below when considered in the light of the accompanying drawings, wherein:

FIG. 1 is an enlarged elevational view partially in section of the device mounted on a squib, FIG. 2 is an enlarged exploded cross-sectional view of the device and the upper portion of a conventional squib, and FIG. 3 is an enlarged exploded cross-sectional view of the desensitizing device.

The device of the invention comprises an outer metal housing which is a good conductor for electricity such as aluminum or copper. Disposed in the housing there is an insert made of some non-conducting material, preferably a solid, hard plastic material such as Bakelite or nylon. Through the insert run two apertures which receive the lead wires of the squib, initiator, or detonator to which the device is to be attached. The insert has an opening in its sides so that there is formed a chamber between the apertures and the metal housing. Before the lead wires are inserted into the apertures, the insulation of both leads is partially removed so that, when inserted into the device, the bared portion of the leads is in alignment with the chamber running from the apertures to the housing. When the device is attached and the lead wires are disposed in the device as described above, there is a chamber or arc gap between the conducting portion of the leads and the metallic housing. Any accumulation of static electricity is discharged from the conducting portion of the lead wires to the metal housing thus preventing an electric current from flowing through the bridge wire and thereby causing an accidental firing. For best results, the metal housing is connected to ground.

Referring now more particularly to the drawings, FIG. 3 illustrates a metal housing 10 and a plastic insert 20 of the desensitizing device. Housing 10 is provided with an aperture or axial bore 12 extending longitudinally therethrough. A first recess 14, provided at one end 16 of housing 10 communicates into aperture 12. A second recess 18 is provided at the opposite end 17 of housing 10 and is also in communication with aperture 12. Housing 10 is further provided with an annular, axially outwardly extending flange or extension having a slit 13 in the periphery of extension 16. Plastic insert 20 is provided with a flanged portion 22 and a pair of apertures or bores 24 and 26 extending longitudinally therethrough. A pair of transverse openings 28 and 32 are disposed in communication with apertures 24 and 26, respectively.

The assembled desensitizing device 40 is illustrated in FIG. 2. Insert 20 is disposed in aperture 12 of housing 10 with the flanged portion 22 of the insert seated in the recess 18 of the housing. Transverse openings 28 and 32 form a chamber between the housing 10 and apertures 24 and 26 of the insert.

Squib 30 of FIG. 2 includes a casing having an open end with a pair of lead wires or conductors 34 and 36 extending therefrom. The lead wires are provided with insulation 38, portions of which are removed as shown at 46, thereby creating an arcuate opening or bared section 42 through the lead wire insulation to the conductors. The lead wires are secured in the squib by a plug 44 snugly housed within the open end of the casing, the plug being formed of a non-conducting hard material such as Bakelite or nylon.

The desensitizing device is installed on the squib by running the lead wires through apertures 24 and 26 and seating the upper portion of the squib in the recess 14 of the device. Slit 13 on the extension of housing 10 allows some expansion to assure a tight fit between the squib and housing. The extension of housing 10 having slit 13 extending from end 16 thereof is preferably formed of a slightly smaller inside diameter than the outside configuration of igniter casing to further assure a tight fit therewith when the casing is telescopingly received within the extension. When assembled, the opening in the lead wires must be aligned with the chamber in the device. The position of the various components after correct assembly is illustrated in FIG. 1.

The distance between the conductor of the lead wire and the metal housing is referred to as D in FIG. 1, while the distance between the conductor and the squib casing is shown as D' and the distances between the lead wires as D" in FIG. 2. Static electrical charges which could accumulate in the lead wires to the extent that sufficient voltage potential is reached to cause a current to pass through the bridge wire or a spark to jump from the lead wires to the casing and thus fire the squib are thereby eliminated since these charges are discharged from conductors 34 and 36 to housing 10 through transverse openings 28 and 32. In this manner the squib is desensitized to static electricity and rendered much safer.

The efficiency of the desensitizer is illustrated by the results of tests with the United States Army's M3 squib. The M3 squib fires if subjected to a discharge of 1,000,000 ergs from a 500 micromicrofarad capacitor via the metal case or lead wire connections. After installation of the desensitizers of the type shown in the drawings, four out of four of the squibs tested were safe to discharge of 9,230,000 ergs. Further tests proved that by decreasing the spacing D between the lead wire conductor and the metal housing of the device, the M3 squibs could be made safe to a discharge of 14,000,000 ergs from a 500 micromicrofarad capacitor.

From the foregoing discussion it is apparent that the device of the invention offers many advantages. First, it greatly reduces the possibility of accidental firings due to static electrical charges. By making the distance between the lead wire conductor and metal housing less than the distance of any built-in arc gap, the squib, initiator, or detonator can be made less sensitive to static charges than at the time it was manufactured. In the case where no arc gap was provided in the manufacture of such items, as in the case of the Army M3 squib, the device provides a safety margin against accidental firing. Moreover, the simple two-piece construction consisting of a metal housing and a non-conducting insert lends itself to economical production. Furthermore, as is obvious from the drawings, installation is extremely simple.

The shape of the device is not critical. However, to conform to the conventional shape of squibs and the like, the device is usually cylindrical. Moreover, it is not necessary that the housing extend over the outer casing in the protected firing device to provide firm attachment since glueing, crimping, twisting the lead wires together above the device, or any other convenient means of attachment will serve the same purpose.

The distance between the lead wire conductor and the metal housing of the device will vary with the particular type of component being desensitized and the degree of safety desired. For example, in the tests on the M3 squib, the distance was varied between 0.005 inch to 0.015 inch. Generally, distances on any initiator, squib, or detonator will fall within this range. It is apparent, however, that the distance between the lead wire conductor and the metal housing of the densensitizer should be less than either the distance between the lead wire conductors or the distances between the lead wire conductors and the metal casing of the squib, initiator, or detonator. For example, in FIG. 1 and FIG. 2, the distance D should be less than D' or D" or discharge of static charges will occur at D' or D" rather than at D.

It is apparent from the above detailed description of the invention that many modifications in the electrical desensitizing device will become apparent to those skilled in the art. The invention is to be limited, therefore, only by the following claim.

I claim:

A static electricity desensitizing attachment device adapted for selective use with electric igniters of the type including:

a conductive casing housing an explosive charge and having an open end;

a non-conductive plug housed in said open end of the casing and forming an end closure therefor;

a pair of insulated lead wires extending from said casing, the inner ends of said wires being secured within said plug and the outer, terminal ends thereof being adapted for connection with a source of firing current, each of said wires having an arcuate, bared section formed transversely through the insulation thereof, said sections being formed in the portion of said wires intermediate said casing end and the respective outer, terminal ends thereof;

said attachment device comprising: a conductive housing having an axial passage extending from end to end therethrough, said housing including an enlarged annular recess provided in one end wall thereof, said recess being concentric with said axial passage; said housing further including an annular extension on the end thereof opposite said enlarged recess, a portion of said extension being formed of slightly smaller, effective inside diameter than the correspondingly shaped outside configuration of said one end of an igniter casing, whereby said housing extension telescopingly receives said casing end snugly therein for securement therewith;

an insert of non-conductive material housed within said axial passage, said insert having an enlarged annular flange at one end thereof, said flange being seated within said recess, said insert including a pair of longitudinal bores extending axially therethrough, said insert further including a pair of apertures formed transversely therein intermediate the ends thereof, each of said apertures connecting a respective one of said bores with said axial passage;

said attachment device being adapted to be disposed about said lead wires adjacent said open end of the casing of said electric igniter whereby the lead wires extend through said axial bores, and one of said bared sections is juxtaposed one of said apertures so as to define therewith an arc gap between said attachment housing and said lead wires whereby said igniter is desensitized against static electricity by said arc gap.

References Cited by the Examiner
UNITED STATES PATENTS 2,408,125 9/46 Rolfes _____ 102—28
3,100,447 8/63 Betts _____ 102—28

FOREIGN PATENTS 538,331 3/57 Canada.

SAMUEL FEINBERG, *Primary Examiner.*